United States Patent [19]
Habegger et al.

[11] 3,824,940
[45] July 23, 1974

[54] APPARATUS AND METHOD FOR USE IN COIL TYING

[75] Inventors: Richard J. Habegger, Grabill, Ind.; Frank R. Dombrowski, Kingston, Ill.

[73] Assignee: General Electric Company, Fort Wayne, Ind.

[22] Filed: Aug. 7, 1973

[21] Appl. No.: 386,371

[52] U.S. Cl............... 112/121.2, 29/205 R, 29/596, 66/1 R, 100/14, 310/260
[51] Int. Cl............................................. D05b 23/00
[58] Field of Search............. 29/596, 205 R, 205 D; 112/121.2, 2; 66/1 R; 100/2, 13, 14, 15; 310/260, 270

[56] References Cited
UNITED STATES PATENTS

| | | | |
|---|---|---|---|
| 2,580,871 | 1/1952 | Wirtz | 66/1 R |
| 2,883,949 | 4/1959 | Ammann | 112/121.2 |
| 3,050,019 | 8/1962 | Muskulus | 112/121.2 |
| 3,628,229 | 12/1971 | Biddison et al. | 29/596 X |
| 3,659,337 | 5/1972 | Gawthrop et al. | 29/606 |
| 3,672,040 | 6/1972 | Arnold | 29/596 |
| 3,685,470 | 8/1972 | Frederick | 112/121.2 |
| 3,713,209 | 1/1973 | Biddison | 29/205 R X |

*Primary Examiner*—Charles W. Lanham
*Assistant Examiner*—Carl E. Hall

[57] ABSTRACT

Apparatus and methods involving lacing or tying cord about end turn portions of coils that project beyond faces of dynamoelectric machine magnetic cores. Method involves pulling and holding final cord segments; and subsequently releasing such segments. In apparatus, stator core having coils therein is placed at tying station and supported while the core and tying units are periodically relatively indexed. Loops of cord are placed about winding portions, for example in the formation of stitches. As the last loop (e.g., stitch) in a tying cycle is commenced, cord pulling member and core are moved relative to each other so that the cord pulling member is located to receive a final cord segment. Alternatively, cord pulling member moves after full development of final cord segment. A portion of final cord segment is grasped in a cord receiving region of cord pulling member. Cord clamping member engages and tightly holds the cord; cord pulling member retracts; and final cord segment is pulled taut and severed. The leading or advancing end of the cord pulling member may be of a blunt or pointed configuration. When a core is to be laced or tied, an end of cord is held in the cord puller and at least part of one or more loops (e.g., stitches) are made on the wound stator assembly. At a predetermined time or after a predetermined number of stitches (or portions thereof) have been made, the end of cord is released. Such release is effected before excessive tension is applied to the core so as to reduce, if not eliminate, cord fraying and cord debris build-up in and around the cord puller. This also prevents malfunctions that might occur as a result of excessive tension on a cord end during indexing of a core being laced.

10 Claims, 6 Drawing Figures

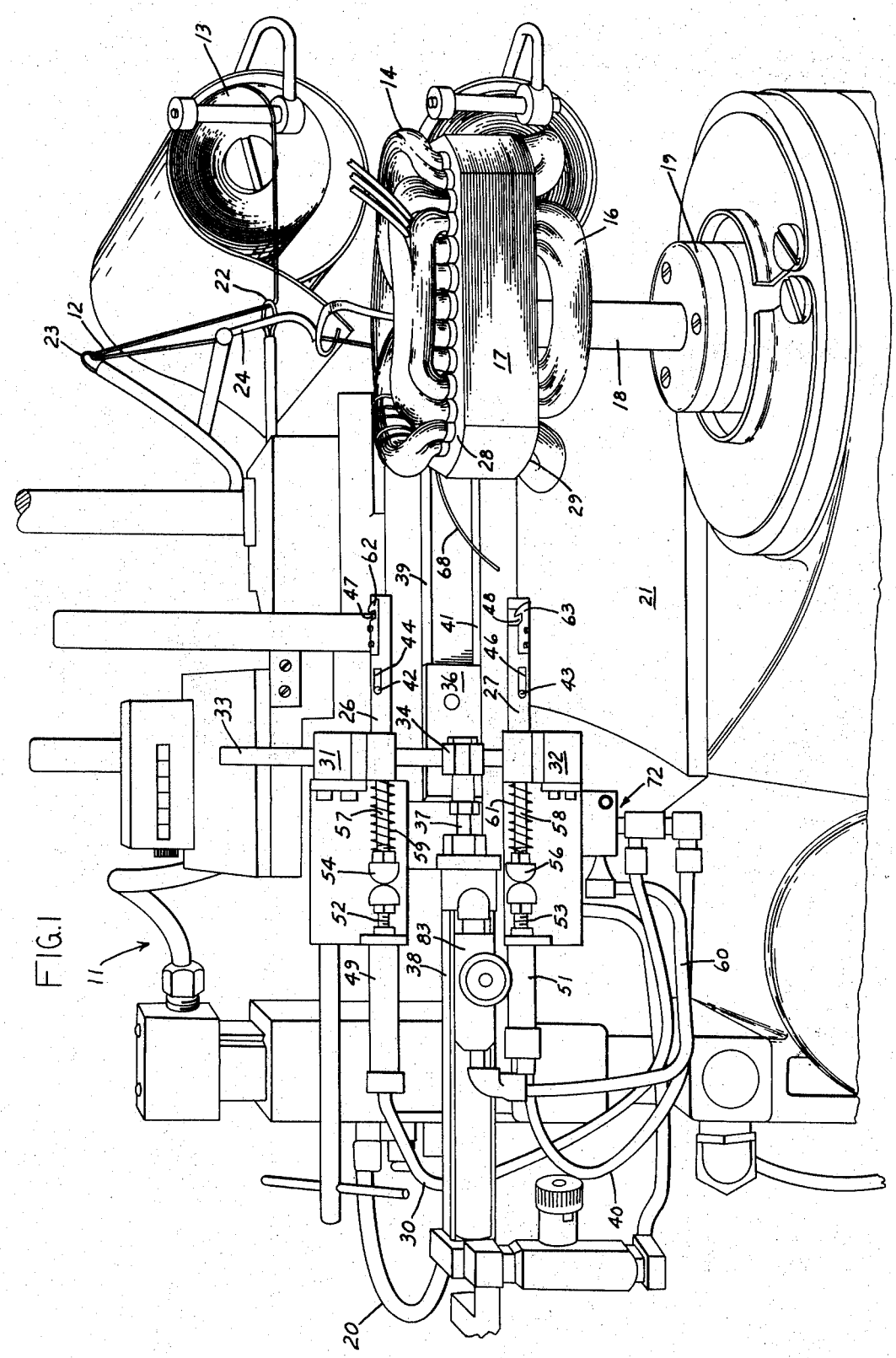

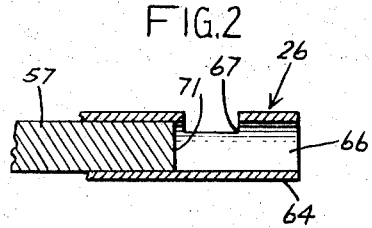
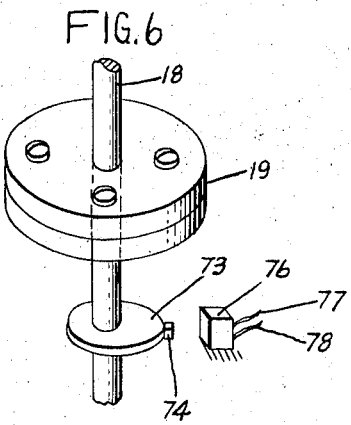
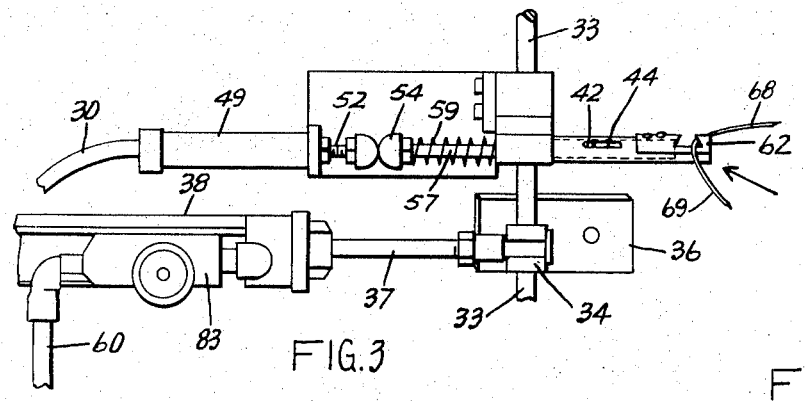
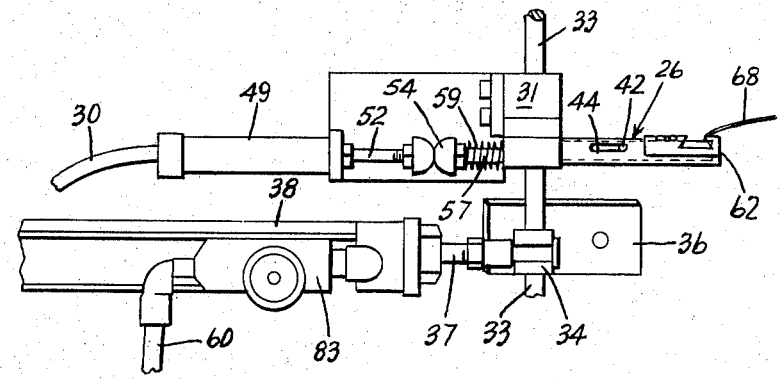
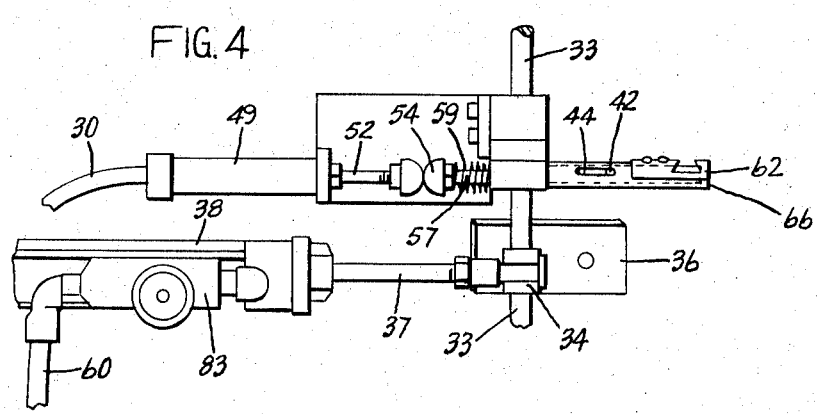

APPARATUS AND METHOD FOR USE IN COIL TYING

CROSS REFERENCE TO RELATED APPLICATIONS

This application is related to: U.S. Pat. application Ser. No. 333,495, filed in the names of Harold T. Fields and Richard J. Habegger on Feb. 20, 1973; U.S. Pat. application Ser. No. 336,727, filed in the name of Richard J. Habegger on Feb. 28, 1973; and U.S. Pat. application Ser. No. 386,372 filed of even date herewith in the names of Richard J. Habegger and Stanley L. Warfel and titled APPARATUS AND METHODS FOR TYING COILS. All of these just referenced applications are assigned to the assignee of the present application.

BACKGROUND OF THE INVENTION

This invention relates generally to apparatus and methods for use in tying or lacing coils in electromagnetic devices, and more particularly to cord handling components and methods for controlling such components and handling segments of tying material used for binding coil end turns projecting beyond the side faces of a dynamoelectric machine core.

Apparatus and methods for tying coils are described, for example, in Gawthrop et al. U.S. Pat. No. 3,659,337 which issued May 2, 1972 and which is assigned to the assignee of the present application. In this Gawthrop et al. patent, the entire disclosure of which is specifically incorporated herein by reference, and in other publications in the art; tying methods and apparatus are disclosed that utilize, in conjunction with a pair of relatively movable tying members, components that grasp final cord segments which are developed at the end of a tying cycle and, subsequently, release such segments.

With prior arrangements and approaches of which we are aware, after the last stitch of a tying cycle or subcycle has been made, a final cord segment is grasped and pulled so as to hold the cord in preparation for a subsequent tying cycle. The cord segment extending between the laced core and the cord puller is severed. However, the end of a cord segment extending between the cord puller and a tying member (such as a string tube) remains clamped and held in the cord puller. The end of the cord so held is gripped very tightly, because of the relatively high tension on the cord during the high speed retraction of the cord puller. Also, the tension in such segment while the next stator is being laced is quite high.

With prior approaches of which we are aware wherein the free end of the cord is held by a cord puller while an unlaced stator is positioned for stitching and until at least some stitches have been formed on the stator; the free end of cord is eventually pulled away from the cord puller when sufficient tension is applied to the cord to overcome the holding force of the cord puller.

One obvious problem associated wth the approach just discussed is that the gripping force of the cord puller must not be so great that the cord will break before being pulled free. In addition, even reduced gripping forces may be so great that the cord, while held under tension in the cord puller, may restrain the stator and tying members from proper relative indexing movements. This can cause damage to the stator or apparatus or both. In addition, the cord may fray as it is pulled from the cord puller; and fuzz or debris from the cord may build up in the cord puller. This can lead to possible apparatus malfunctions and also would normally necessitate periodic cleaning of the cord puller.

It would be desirable to provide tying apparatus and methods whereby excessive tension on a cord segment held by a cord puller may be avoided, if not eliminated. It also would be desirable to provide apparatus and methods whereby cord fraying and cord debris build-up may be reduced, if not eliminated; and to provide improved apparatus and methods capable of overcoming the various difficulties discussed above.

SUMMARY OF THE INVENTION

Accordingly, it is a general object of the present invention to provide new and improved apparatus and methods for holding cord ends in coil tying apparatus.

It is another object of the present invention to provide new and improved coil tying apparatus wherein excessive cord tension is avoided.

It is yet another and more specific object of the present invention to provide a method and apparatus for releasing a cord segment at a predetermined time after the lacing of a coil with cord has commenced.

It is a still further object of the present invention to provide new and improved coil tying apparatus having new and improved cord pulling mechanisms.

In carrying the above and other objects in one form, we provide improved apparatus and methods involving lacing or tying cord about end turn portions of coils that project beyond side surfaces, e.g., ends or "faces," of a dynamoelectric machine magnetic core; pulling and holding end segments of cord; and subsequently releasing such end segments. In an illustrated embodiment, a stator core having coils thereon is supported while the core and tying units are periodically relatively indexed. As the last stitch in a tying or stitching cycle is commenced, a cord pulling member and the core are moved relative to each other so that the cord pulling member is located to receive a final cord segment (e.g., a cord segment associated with the last stitch in such cycle). As the last stitch is completed, a portion of the final cord segment is moved into a cord receiving region of the cord pulling member. Thereupon, a cord clamping member engages and tightly holds the cord so that, upon retraction of the cord pulling member, the final cord segment is pulled taut and is severed. The leading or advancing end of the cord pulling member may be of a blunt or pointed configuration. When a core is to be laced or tied, an end of cord is held in the cord puller and one or more stitches are made on the core. Then, at a predetermined time or after a predetermined number of stitches have been made, the end of cord is released. Such release is effected before excessive tension is applied to the core so as to reduce, if not eliminate, cord fraying and cord debris build-up in and around the cord puller. This also prevents malfunctions that might occur as a result of excessive tension on a cord end during indexing of a core being laced.

We have illustrated herein apparatus wherein coil portions at two ends of a stator core are tied or laced concurrently and wherein the core periodically indexes relative to tying units. It will be understood, however, that our invention may be embodied in, and methods practicing our invention may be carried out while using, apparatus wherein coil portions at only one end of a core are laced or while using apparatus wherein tying units periodically index relative to a stationary core — whether coil portions at one or both ends of the stationary core are being laced.

The subject matter which we regard as our invention is particularly pointed out and distinctly claimed in the concluding portion of the specification.

Our invention itself, however, both as to its organization, method of operation, and preferred sequence of steps together with further objects and advantages thereof, may best be understood by reference to the following description taken in conjunction with the accompanying drawings wherein:

FIG. 1 is a view in perspective of apparatus, with parts removed and parts broken away, for tying coils in one preferred embodiment of the present invention, and with which our novel method may be practiced in one form;

FIG. 2 is an enlarged cross-sectional view, with parts removed and parts broken away, of a cord puller used in the apparatus of FIG. 1;

FIGS. 3–5 are somewhat schematic side elevations of a portion of the apparatus of FIG. 1, and these figures schematically depict the relative positions of parts of such apparatus during various steps taken while practicing our method; and FIG. 6 is a schematic perspective view, with parts removed and broken away, illustrating components and one approach that may be followed to control various operations of the apparatus of FIG. 1.

DESCRIPTION OF THE PREFERRED EMBODIMENTS

Turning now to the drawings in more detail, we have illustrated improved apparatus generally denoted by the reference numeral 11, embodying the invention in one form thereof, and capable of practicing one form of the inventive method. The apparatus 11 is shown as being set up for tying or binding cord 12, supplied from a reel or spool 13, about coil end turn portions 14 of windings accommodated on a magnetic stator core 17. A second supply of cord, for tying end turn portions 16, is hidden from view by stator 17 in FIG. 1. Cores of the type shown at 17 are described in more detail in numerous patents, including the above referenced Mason patent. Accordingly, further description of such cores is not presented herein.

The apparatus 11 includes an article or core holder assembly of the type shown and described in detail in the Gawthrop et al. patent. The core holder assembly is carried by the shaft 18 which in turn is movable in bearing or support block 19 on the machine frame 21. The shaft 18, and thus the core support and core, are periodically indexed relative to the frame 21 by drive mechanisms as disclosed in the above referenced Gawthrop et al patent. The drive mechanisms may, when desired, incorporate features of and embody the novel aspects of the above referenced U.S. Pat. applications Ser. Nos. 333,495 and 336,727, the entire disclosures of which are incorporated herein by reference.

Since many parts of the apparatus 11 correspond to parts of the apparatus described in the just mentioned applications or the Gawthrop et al patent, primary discussion herein is directed to those portions of the apparatus 11 that differ from such prior apparatus.

While lacing or tying cord about the end turn portions of the windings on core 17, cord 12 is fed through tensioning eyelets 22, 23 to a string tube 24. The string tube, in conjunction with a lacing hook, stitches or ties cord about the end turn portions 14. In the apparatus 11, a lacing tube and string tube are also provided (along with tensioning eyelets) to wrap or lace cord from the hidden cord supply about the end turn portions 16 of the windings on the stator 17. As the lacing hook and string tubes cyclically move to dispose cord about the end turns, the stator core 17 is periodically indexed. This indexing movement may be in the fashion taught by the Gawthrop et al. patent or as taught in the above referenced Fields and Habegger application. In addition, the lacing hooks and string tubes may develop a stitch following each index of the stator core 17, or one or more stitches may be selectively skipped at either end of the stator as taught in the above referenced Habegger U.S. Pat. application No. 336,727.

The upper set of tying members, (i.e., the upper string tube 24 and upper lacing hook) may be movable vertically relative to the upper face of core 17 so as to accommodate various stack heights or variations in the height of a given stator core, and apparatus 11 does include this feature. Such adjustment may be effected manually or automatically, and a manual approach was used for apparatus 11.

Upon completion of a lacing or tying cycle (or subcycle) the lacing operation terminates, and a pair of cord pullers 26, 27 are carried forward to lie in a desired predetermined position relative to the faces 28, 29 of core 17 while the last or final stitch is being developed or completed. As the development of such last stitch is completed, the cord tubes lay a final segment of cord along a cord receiving region of the cord pullers. Thereafter, the cord pullers 26, 27 return to the position thereof shown in FIG. 1, pull a segment of string or cord from each cord tube, and sever the cord so that the laced core is freely removable from the apparatus 11. The actuating and string release mechanism associated with the cord pullers, and various steps involving pulling a final cord segment, severing the cord, and releasing a cord at a preselected time after commencing a stitching operation on a subsequent core, will be described in more detail hereinafter. It is to be noted, however, that procedures associated with laying a final cord segment along a cord receiving region of a cord puller may be accomplished as taught and claimed in the above-identified commonly assigned Habegger and Pat. U.S. Pat application Ser. No. 386,372, the disclosure of which is incorporated herein by reference. Also, when the Habegger and Warfel approach is not followed, the cord pullers 26, 27 may be relatively sharp or pointed.

The cord pullers 26, 27 are carried by mounting blocks 31, 32 which in turn are constrained to move toward and away from the stator core 17 by a rodlike member 33. It will be understood that the block mounting block assembly 31 is free to move vertically along the rod 33 when the apparatus 11 is provided with means for adjusting the height of the upper tying members. If the lower tying members were to be similarly adjusted, rod 33 would be extended, and lower block 32 would be movable therealong. The rod 33 is carried in a pusher block 34 which is mounted to a slide block 36 for movement therewith. The pusher block is connected to the end of the piston or ram 37 of a fluid cylinder 38 and is moved or actuated thereby. The fluid cylinder 38 may be, as desired, hydraulic or pneumatic, pneumatic cylinders being used throughout in Fig. 1.

The control circuitry associated with the apparatus 11 controls the valves which connect selected ones of the conduits or tubes 20, 30, 40, 50, etc., and high pressure fluid is supplied to cylinder 38 via conduit 20 so as to advance rod 37. The block 36 then is forced to slide along a pair of longitudinally extending parallel tracks 39, 41, along the machine frame 21 and which are formed by a pair of guide members mounted to the frame.

When the cord pullers 26 and 27 are advanced, pins 42 and 43 are in a position relative to slots 44, 46 as shown in Fig. 1; and a plunger carried in the hollow tubular portion of the cord pullers 26, 27 is in a retracted position. Final cord segments are received and held in cord receiving regions 47, 48 of the cord pullers after a final stitch is made on the winding of a given stator core. With the specific apparatus 11 shown in FIG. 1, when final cord segments are to be positioned in the regions 47, 48; the cord pullers 26, 27 are advanced, final cord segments are positioned as desired, and cylinders 49, 51, are actuated by high pressure fluid applied through lines 30 and 40. When the cylinders 49 and 51 are actuated, the rods 52, 53 extend and move the heads 54, 56 of plunger rods 57, 58 in a direction to compress the springs 59, 61. Thus, the plungers move and clamp the final cord segments. Thereafter, while springs 59, 61, remain compressed, rod 37 retracts as high pressure fluid is supplied to line 60, and final segments of cord are pulled taut between the cord tubes and pullers as the pullers retract to the dwell position thereof shown in FIG. 1. As the pullers 26, 27 are retracted (the springs 59, 61 remaining compressed), the cutters or blades 62, 63 sever the portion of the final cord segments that extended between the laced windings and the cord pullers. Thereafter, the laced core 17 is removed from the apparatus 11, another core placed on the core support, and a stitching cycle again started while the cord pullers hold the severed end of cord. After stitching has begun, a new, unlaced core is indexed, tying members make a stitch; the core is indexed, etc. Before the cord segments held by the cord pullers become so taut as to interfere with proper indexing of the core and before such segment is placed under tension in an amount sufficient to pull the cord free from the cord pullers and thus cause the cord to fray or shed debris such as cord fuzz; the cord holding means associated with the cord pullers release the end of cord.

Such release of cord is accomplished at a preselected time or a preselected point after a new stitching cycle has commenced. Preferably, the time of release is variably adjustable so that release will occur at a preselected time or after a predetermined number of stitches. Preferably, a release signal is generated which in turn causes actuation of valves that vent (i.e., relieve high pressure) conduits 30 and 40. The compressed springs 59, 61 expand, and rods 52, 53 move into the cylinders 49, 51. As the springs 59, 61 decompress, the plunger rods 58, 59 move to the relative position thereof illustrated in FIG. 1. It should at this point be recognized that tension, rather than compression springs 59, 61 may be used; and in which case such springs would be under tension while rods 52, 53 are advanced.

With reference now to FIG. 2, a portion of the cord puller 26 has been shown to an enlarged scale, in cross-section, with parts removed, and with parts broken away. Puller means, when in the form of puller 26, includes the plunger 57 and a hollow cylindrical member 64. As spring 59 (see FIG. 1) is compressed, the plunger 57 moves toward the free or distal end 66 of the cylindrical member 64. It is to be understood that the member 64 may be cylindrical, rectangular, or any other desired cross-sectional configuration. It is, however, preferable that the configuration of the plunger rod 59 correspond to the internal configuration of the particular tubular member that is used in lieu of the cylindrical member 64. In addition, while the member 64 has been illustrated as having an open distal end 66, the distal or free end 66 could be closed since cord debris normally will not be left in the cord puller. An open distal end (as illustrated in FIG. 2) does however, ensure that foreign material will not becom lodged within the member 64 and interfere with reliable cord clamping action as a cord segment is clamped and held against the clamping anvil edge 67 (or surface when so designed) by the end 71 of rod 57.

With reference now to FIGS. 3-5 and the corresponding portion of FIG. 1, a preferred sequence of operational steps will be described. Just as a final stitch is being developed for a first stator, the puller 26 and parts associated with the actuation thereof will be in their relative positions shown in FIG. 1. When the teachings of the above-identified Habegger and Warfel applications are followed, the rod 37 is extended (see FIG. 2) while a final stitch is being developed.

On the other hand, when prior approaches are followed, the cord puller 26 is not actuated until after a final cord segment has been fully developed. In this event, the rod 37 is extended relative to the cylinder 38 after the cord tying members of the apparatus 11 reach a final dwell position.

With either approach, however, at the end of a stitching cycle, as the tying members move toward (or just after they have so moved) to their final dwell position, the rod 37 is extended relative to the cylinder 38. The parts of cord puller 26 will be generally in the relative positions thereof shown in FIG. 3. At this time, a final cord segment 68 extends from a cord feeding tube (such as the tube 24 in FIG. 1) to the cord puller mechanism. Since the final cord segment has not yet been severed, a portion 69 thereof also extends from the cord puller 26 to the final stitch on the windings of the stator core that still is supported in the apparatus 11.

When a signal is given (for example by one final index of the core), high pressure fluid is supplied through conduit 30 to cylinder 49. Thereupon, rod 52 is advanced from the relative position thereof shown in FIG. 3 to the relative position thereof indicated in FIG. 4. With the advance of rod 52, spring 59 is compressed and plunger 57 moves toward the free end 66 of tube, and thus clamps the final cord segment 68.

For ease of illustration, the final cord segments 68, 69 have not been shown in FIG. 4. However, it will be understood that the final cord segment 68 will be clamped between the advancing end 71 of plunger 57 and the clamping or anvil surface 67. When plunger 57 has moved in the manner just described, the pin 42 will have advanced to the front end of slot 44 as best revealed in FIG. 4.

Conduits or lines 30 and 60 are interconnected through a single connection block 72 (see FIG. 1). Thus, when high pressure fluid actuates cylinder 49, high pressure fluid is also supplied to conduit 60 so as to cause piston rod 37 to retract. It will be understood that the friction and masses of the various parts are such that rod 52 extends before rod 37 retracts. To ensure this desired sequence however, a manually controllable variable restriction 83 between line 60 and cylinder 38 may be provided. Then, by restricting (i.e., increasing the resistance in line 60), cord will be clamped before the puller 26 returns to its dwell position as shown in FIG. 5.

FIG. 5 illustrates the relative positions of the parts of cord puller 26 after rod 37 has been retracted. During retraction of rod 37, the blade or cutter 62 severs the portion of the final cord segment that had extended between cord puller 26 and the laced end turns on the last core which was laced. The final cord segment 68 however, continues to be held by the cord puller 26; and this segment extends from the cord puller to the cord tube 24. Thereafter, the core which has just been laced is removed from the apparatus 11; and an unlaced core is positioned on the core holder of the apparatus. Stitching of the end turns of the new core is then commenced, with the new core indexing after the formation of each stitch.

As the new core starts indexing, the cord segment 68 becomes taut. However, before the tension in cord segment 68 becomes sufficiently great to pull the cord segment 68 free from the cord puller 26, or sufficiently great to interfere with proper indexing of the core being laced; the cylinder 49 is vented (for example by a valve which connects conduit 30 to atmosphere). When pressure is removed from the cylinder 49, the compressed spring 59 returns to its free state and piston rod 52 to a position within cylinder 49, this condition being shown in FIG. 1.

The time during a given cycle at which the cord puller releases the final cord segment 68 may be adjustably varied. It often is preferable that the cord segment 68 be released after one or two stitches have been formed on a new core.

Turning now to FIG. 6, one means by which a "cord release" signal may be generated will be described. The structure shown in FIG. 6 represents the shaft 18 which carries a core support member of apparatus 11. As shaft 18 undergoes intermittent indexing movement, a core being laced also is indexed. Carried on shaft 18 is a proximity flag or other position indicating device 73. As the projection 74 on such device moves adjacent to the proximity sensor 76, a signal appears on the leads 77, 78. This signal, when applied to the control circuitry associated with the apparatus 11, causes the valves which control the pressure condition in conduit 30 to vent conduit 30 so that spring 59 can then effect the release of final cord segment 68. This also causes venting of conduit 60, but rod 37 does not again extend until high pressure fluid is connected to conduit 20.

Since flag 73 is adjustably mounted on shaft 18 (and since sensor 76 may be adjustably mounted on frame 21); the exact time for release of cord segment 68 may be adjustably preselectively determined.

It should be understood that a main drive shaft or some other shaft or other member of apparatus 11 may carry a proximity sensed flag or other signal originating means (e.g., a mechanical limit switch) for initiating control signals that are used for the purposes above described. Also, another proximity flag (not shown) may be carried on shaft 18. This other flag, with another not shown proximity sensor may then be used to cause actuation of valving that causes the string puller to advance at the end of a lacing cycle. This all is pointed out in more detail in the incorporated by reference Habegger and Warfel U.S. Pat. application No. 386,372.

It is to be understood that any signals derived from parts of apparatus 11 (other than shaft 18) for the purposes just described may be preselectively controlled. For example, by slightly adjusting the signal initiation point during movement of such parts, cord puller 26 may be advanced during any desired instant at the end of a lacing cycle.

It will be appreciated from the foregoing that improved arrangements now may be provided which can be used in lacing apparatus of the various types known heretofore, and where the problems discussed hereinabove associated with excessive tension in a final cord segment may be avoided. It should also be appreciated that, in a preferred form, apparatus ambodying the invention may include cord pullers that, on signal, clamp a final cord segment; and hold part of such segment and sever another part thereof. Such cord puller, preferably, is advanced to a position so that a final cord segment may be laid into a cord receiving region of the string puller before positively clamping the segment. Thereafter, preferred steps include moving the clamped portion of the cord segment to a position remote from a cord tube (during which time cord is pulled from the cord tube) and severing that portion of the segment that extends between the cord puller and a previously laced core.

Thereafter, the previously laced core may be removed from the apparatus, and a new core will be positioned on the apparatus. When lacing of a new core is commenced, the end of the previously developed final cord segment (that is the cord segment extending between the cord puller and the cord tube) continues to be held by the cord puller. Then, at a predetermined time after lacing of the new core has commenced, the cord puller and holder releases such end. This release occurs, on signal, at a preselected time before excessive tension has been applied to the cord segment extending between the cord puller/holder and partially laced or tied core.

It should now be apparent to those skilled in the art that, while we have shown and described what at present are considered to be the preferred embodiments of our invention in accordance with the Patent Statutes, changes may be made in the structures and approaches disclosed without actually departing from the true spirit and scope of our invention. We therefore intend to cover in the following claims all such equivalent variations as fall within the invention.

What we claim as new and desire to secure by Letters Patent of the United States is:

1. Apparatus for tying cord about end turn portions of coils projecting beyond at least one side surface of a magnetic core carrying side turn portions of the coils, the apparatus comprising: tying members; means for periodically effecting relative movement between a core and such tying members; means for grasping a final cord segment in a final stitch and for pulling the final cord segment away from a stator core about which cord has been tied by the tying members; and control means for providing a signal at a predetermined time after a tying cycle has commenced; said means for grasping and for pulling including mechanism for releasing the final cord segment when a signal is provided by the control means.

2. The apparatus of claim 1 wherein the means for grasping and pulling includes a cord gripping and pulling assembly and at least two fluid motors; a first fluid motor being arranged to advance a cord receiving region of said assembly to a cord pick-up position, and a second fluid motor being arranged to cause said assembly to clamp a final cord segment; said cord gripping and pulling assembly comprising said mechanism for releasing and including a cord clamping member that releases the final cord segment in response to a signal from the control means.

3. The apparatus of claim 2 wherein at least one of the fluid motors comprises a pneumatic cylinder.

4. Apparatus for tying cord about end turn portions of coils projecting beyond at least one side surface of a magnetic core carrying side turn portions of the coils, the apparatus comprising: tying members for tying cord about coils on a core; means for periodically causing relative movement between a core and the tying members; means for grasping a final cord segment after a final stitch about the coils has at least been started, and for withdrawing the grasped portion of such final cord segment to a first location spaced from the tying members, said means including a cord puller having at least two relatively movable members; and means for generating a signal at a predetermined time during a subsequent tying operation while the final cord segment is grasped and held at the first location; at least one of said at least two relatively movable members being actuable in response to the signal so as to release the grasped portion of the final cord segment.

5. The apparatus of claim 4 wherein one of said at least two relatively movable members is a cord puller tube, another of said at least two relatively movable members is a rod movable within said tube; and wherein cord severing means are supported on said tube.

6. The apparatus of claim 5 wherein the rod is normally biased to a first position relative to the tube; and wherein power means are provided for urging the rod to a second position relative to the tube in response a signal generated by said means for generating a signal.

7. A method of tying cord about end turn portions of windings supported on magnetic cores, grasping a first portion of a final cord segment, severing a second portion of the final core segment while continuing to grasp the first portion of such segment, and subsequently releasing the first portion of such segment, said method comprising: placing a first wound magnetic core at a tying station; placing cord loops about end turn portions of a winding on the first magnetic core and forming a final cord segment extending from a last loop on the winding; grasping a first portion of the final cord segment; moving the grasped first portion of the final cord segment to a given location and severing a second portion of the final cord segment between the grasped first portion thereof and the last loop; moving the first magnetic core from the tying station; placing a second wound magnetic core at the tying station; forming at least part of an initial cord loop about windings on the second core while continuing to grasp the first portion of the final cord segment; and subsequently releasing the grasped first portion of the final cord segment at a preselected time before the final cord segment is subjected to excessive amounts of tension.

8. The method of claim 7 wherein grasping a first portion of the final cord segment comprises moving a clamping member against the bias of spring means and clamping the first portion of the cord segment against a clamping surface with the clamping member.

9. The method of claim 7 further including moving a cord pulling assembly into proximity with the first magnetic core before the last loop associated therewith has been completed; laying the first portion of the final cord segment proximate to a cord receiving region of the first assembly; grasping the first portion of the final cord segment by clamping the first portion of the final cord segment in the cord pulling assembly; and moving the grasped first portion by moving the cord pulling assembly.

10. A method of retracting, and subsequently releasing, a segment of cord from a tying member in an apparatus for tying cord about the end turn portions of windings supported on a magnetic core following completion of a cord tying operational sequence, the method comprising: moving at least one tying member relative to the end turn portions of the core so as to wrap cord about the end turn portions until a cord tying sequence is completed; moving a cord puller into juxtaposed position with respect to the magnetic core; grasping a final cord segment extending between the tied portion of the core and at least one tying member; pulling the final cord segment to a desired location relative to the at least one tying member; commencing a cord tying operational sequence for the end turn portions of a second magnetic core while continuing to grasp at least a portion of the final cord segment; generating a signal after the cord tying operational sequence for the end turn portions of the second core is initiated; and releasing the grasped portion of the final cord segment in response to the signal.

* * * * *